United States Patent
Wheeler

[11] 3,761,066
[45] Sept. 25, 1973

[54] INLINE WATER CARBONATOR

[76] Inventor: Clarence W. Wheeler, 1767 41st St., St. Petersburg, Fla.

[22] Filed: Sept. 8, 1971

[21] Appl. No.: 178,682

[52] U.S. Cl............... 261/78 A, 99/323.1, 222/129, 261/51, 261/DIG. 7
[51] Int. Cl............................................. B05b 7/02
[58] Field of Search.................. 261/78 A, 76, 111, 261/113, DIG. 7, DIG. 26, 19, 20, 38, 42, 43, 51, 49, 50, 52, 58, 59, 61, 64, 66, 120, 121, 122, 123; 99/28, 79, 275, 323.1, 323.2; 222/52, 129, 145, 129.1, 129.2, 190, 564

[56] References Cited
UNITED STATES PATENTS

| 537,509 | 4/1895 | Wardle et al. | 261/111 X |
| 2,201,429 | 5/1940 | Deibel | 261/76 X |
| 2,675,358 | 4/1954 | Fenley, Jr. | 261/78 A X |
| 3,028,151 | 4/1962 | Kittle | 261/79 A X |
| 3,211,331 | 10/1965 | Marisic | 222/1 |
| 3,388,868 | 6/1968 | Watson et al. | 239/427 |
| 3,524,630 | 8/1970 | Marion | 261/78 A X |
| 3,256,802 | 6/1966 | Karr | 99/275 |

Primary Examiner—Dennis E. Talbert, Jr.
Attorney—Roy E. Raney et al.

[57] ABSTRACT

An inline water carbonator introduces CO2 and fresh water into a conduit leading to a carbonated water dispensing valve each time the valve is opened. The CO2 and water are thoroughly mixed in the conduit as the carbonated water is dispensed through the valve so that the water is charged with CO2 when it is dispensed.

15 Claims, 2 Drawing Figures

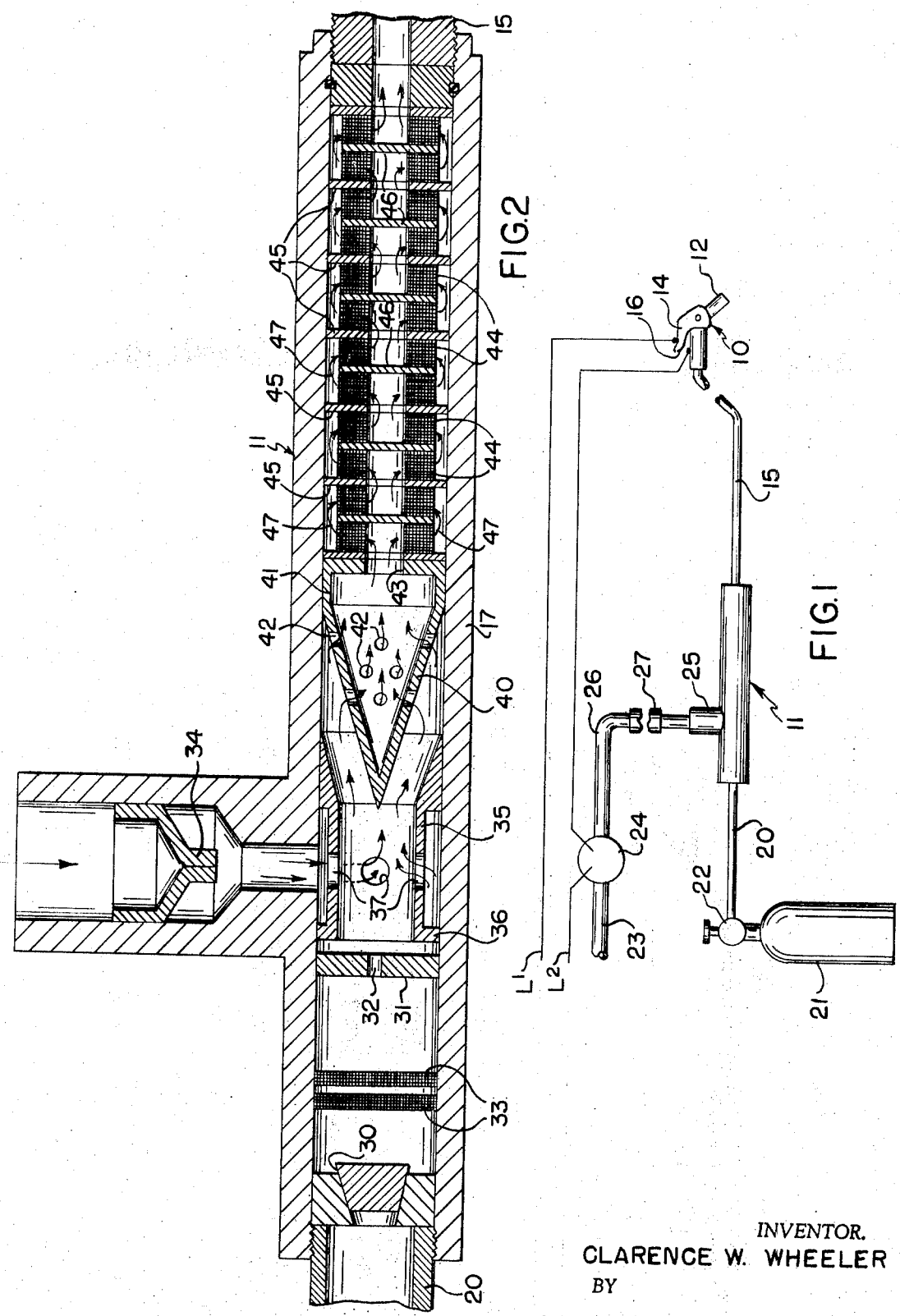

3,761,066

INLINE WATER CARBONATOR

FIELD OF THE INVENTION

The present invention relates to apparatus for effecting absorption of a gas into a liquid and is particularly suitable to carbonate water for use in the preparation of beverages and the like.

BACKGROUND OF THE INVENTION

It is common practice to carbonate water for the preparation of beverages by providing a reservoir tank into which CO2 and water are introduced and mixed so that CO2 is absorbed by the water. The carbonated water is drawn from the tank and dispensed through a suitable valve as needed. The supply of carbonated water is maintained in the tank by automatically introducing fresh water into the tank in response to the water level falling below a given point and maintaining a supply of CO2 under pressure in the tank. Absorption of $CO_2$ by the water in the tank is promoted by spraying the water in the $CO_2$ atmosphere of the tank or by agitating the water by motor driven paddles or the like.

Water carbonators of the type mentioned are unsatisfactory because the reservoir tanks are bulky, the water level controls are relatively expensive and are subject to malfunction and costly maintenance.

THE PRESENT INVENTION

A principal object of the present invention is the provision of carbonating apparatus particularly suitable for preparing beverages and the like which functions to mix $CO_2$ and fresh water in the conduit leading to a dispensing valve as the carbonated water is dispensed. Thus, no reservoir for retention of the $CO_2$ and water is required, thereby eliminating the space requirements of a reservoir tank and its attendant water level controls and water mixing devices.

Another object of the invention is the provision of an inline water carbonator of the type mentioned which utilizes the flow of CO2 and water towards the dispenser valve to agitate and mix the CO2 and water thereby eliminating the requirement for moving parts to effect adequate charging of the water with $CO_2$.

In carrying out the invention a conduit unit is provided in the line leading to the carbonated water dispenser valve and tap or fresh water and $CO_2$ are introduced into the unit adjacent one end and are thoroughly mixed as the water passes through the conduit to the dispensing valve. The source of $CO_2$ has a regulated pressure and the water is introduced into the conduit under a regulated psi which is substantially less than the source pressure of the $CO_2$. The $CO_2$ is introduced into a primary mixing zone of the conduit unit through a pressure reducing orifice which is of a dimension to reduce the gas pressure during flow into the conduit to a value slightly below the water pressure. When the carbonated water dispensing valve is opened, the reduction in pressure in the conduit effected thereby causes flow of water and $CO_2$ into the conduit and as the water and $CO_2$ flow through the conduit $CO_2$ is absorbed by the water. When the dispensing valve is closed, the $CO_2$ pressure in the conduit unit increases substantially above the water pressure. Means are provided to prevent backflow of water and $CO_2$ to their sources.

In the preferred form of the invention baffle means are located in the conduit unit to agitate and break up the gas and water into small bubbles so as to obtain maximum surface exposure between the water and gas.

Other objects and advantages of the invention will be apparent from the following description of a preferred form thereof, reference being made to the accompanying drawings wherein:

FIG. 1 is a schematic showing of a carbonated water dispenser embodying the invention; and FIG. 2 is a longitudinal sectional view of the water carbonator unit of the dispenser shown in FIG. 1.

Referring to FIG. 1, a carbonator water dispenser or dispensing system for serving carbonated beverages is shown. The system comprises a dispenser valve 10 through which carbonated water from a carbonator unit 11 is dispensed. The dispenser may be of any suitable type, and includes a nozzle 12 and a valve operating member 14. Carbonated water is supplied to the valve 10 through tubing 15. When the member 14 is depressed, the valve opens and carbonated water is discharged through the nozzle. In the form shown, an electric switch 16 is closed when the valve member 14 is depressed.

The carbonator unit 11 comprises a tubular member 17 which forms a conduit for the flow of water and $CO_2$ to the valve 10. The left-hand end of the member 17 as viewed in the drawings, is adapted to receive $CO_2$ gas via a tube 20 suitably attached to the end of the member. The tube 20 is connected with a source of $CO_2$ gas and in the form of the invention shown, the gas is supplied from a conventional bottle 21 to which the tube 20 is connected through a pressure regulator 22 set to deliver gas at about 100 psi when carbonated water is being dispensed.

Water is supplied to the conduit member 17 from a convenient water main 23 and is delivered to the unit 17 under a predetermined pressure by an electric motor driven pump 24. The inlet of the pump is connected with the water main and the discharge of the pump is connected with an inlet branch 25 of the conduit 17 by a pipe 26. Preferably, the pipe 26 passes through a chiller 27. The chiller may be of any conventional construction and serves to chill the water in the pipe 26 to 45°F. or less to enhance carbonation thereof.

The motor for driving the pump is energized by power lines L1,L2, and the motor circuit is controlled by the switch 16. In practice, the circuit to switch 16 would be of a relatively low voltage, such as 24 VAC and would control a relay switch for the motor 24. For simplicity, such circuitry is not shown.

The pump 24 includes a pressure regulator set to provide a water discharge pressure 20 to 30 psi below the $CO_2$ pressure. In the present disclosure, the regulator is set to discharge water at 75 psi. Thus, whenever the valve operating member 14 is depressed, the pump 24 is energized. Any other suitable means could be employed to provide the water pressure desired.

The carbonator unit 11 includes a check valve 30 at the CO2 entrance end of the conduit 17 to prevent backflow of $CO_2$ from the unit. A plate 31 having a restricted orifice 32 therethrough is secured transversely of the conduit 17 to provide a pressure reduction of gas moving into the portion of the conduit into which water is introduced, as is explained more fully hereinafter. Preferably, a pair of filter screens 33 are interposed between the check valve 30 and the orifice plate 31 to prevent clogging of the orifice.

As mentioned previously, water discharged from the pump 24 enters the unit 11 through the branch 25. A check valve 34 is positioned in the branch to prevent backflow of water from the unit.

A primary mixing chamber for $CO_2$ and water initially entering the unit 11 includes a baffle member 35. The member 35 is formed of a suitable material, such as plastic, and is tubular with the right-hand end flared. An annular flange 36 is provided at the other end, and the periphery of the flange is sealed to the inside walls of the conduit 17. Four openings 37 are formed in the wall of the baffle member 35 and are spaced at 90° to one another. (Only three of the openings 37 appear in the drawings). As is indicated by the arrows in FIG. 2, water enters the interior of the baffle member 35 through the openings 37 and is mixed with $CO_2$ gas flowing into the member through the orifice 32.

A secondary mixing chamber is formed in the conduit 17 by a hollow cone-shape baffle member 40. The baffle member 40 has a cylindrical base 41 which is sealed to the inside walls of the conduit 17 and the cone portion projects axially into the flared end portion of the baffle member 35. The walls of the baffle 40 forming the cone have a plurality of openings 42 therethrough for admitting numerous streams of water and $CO_2$ into the interior of the baffle member. The mixture of water and $CO_2$ exits the baffle member 40 through an axial opening 43 formed in the right-hand end of the member.

A tertiary mixing chamber is formed in the conduit 17 by a series of axially aligned cylindrical screen members 44 separated alternately by annular baffles 45 and disc baffles 46. The segments 44 form tubular segments having numerous relatively small openings through the walls thereof, which walls are spaced from the insides of the conduit 17. The baffles 45 and 46 are arranged in the conduit 17 so that they cause the water and $CO_2$ to flow radially through the openings through the cylindrical walls of the members 44 in alternate directions, as is indicated by the arrows 47. The direction of the flow of water and gas is reversed in alternate members 44. The passage of the water through the relatively small interstices of the sceen mesh forming the walls of the cylindrical members 44 breaks the water and $CO_2$ into small bubbles whereby maximum exposure of water to $CO_2$ is effected. The water which exits the conduit 17 through the tube 14 is highly charged with $CO_2$ and provides a quality carbonated water at the dispenser valve 10.

It will be understood that although the members 44 are shown comprised of screening material, they could be formed of any suitable material having a porous character.

When the carbonator is subject to a static condition, i.e, when the dispenser valve 10 is closed, the $CO_2$ pressure inside the conduit 17 will be higher than the regulated pressure in the conduit 20. For example, the $CO_2$ pressure will generally be in the order of 110 psi. This pressure prevents inflow of water or additional fresh $CO_2$. The check valves 30 and 34 prevent backflow of $CO_2$ and water, to their respective sources.

When the dispenser valve 10 is opened, the pressure in conduit 17 is reduced and the water pump 24 is actuated to provide a water pressure of 75 psi at the inlet to the conduit 17. The orifice 32 of the pressure reducing plate 31 restricts the flow of $CO_2$ into the primary mixing chamber so that a pressure of about 74 psi will be present. Therefore, water enters the chamber along with $CO_2$ gas. As carbonated water is dispensed through the valve 10, fresh water and $CO_2$ enters the conduit 17 and is mixed in the three mixing chambers with the amounts of $CO_2$ absorbed by the water increasing as the water moves to the outlet of the conduit.

The size of the orifice 32 is selected to reduce the CO2 pressure to slightly below the pressure of the water supply when the dispenser valve is opened. The orifice 32 must not be so small as to restrict the supply of $CO_2$ below that required to effect satisfactory carbonation of the water.

When the dispenser valve 10 is closed, the water and CO2 mixtures in the mixing chambers in the conduit 17 are maintained under the static pressure of the $CO_2$ which retains a high degree of absorption of $CO_2$ by the water. Thus, highly carbonated water is available at all times at the dispenser 10, and fresh carbonation occurs only as required for immediate usage.

It will be understood that although the preferred form of the invention has been described as a water carbonator, the invention could be applied to systems in which gas other than CO2 is absorbed in water or a liquid other than water.

I claim:

1. A liquid and gas mixing and dispensing system comprising a source of liquid under pressure, a source of gas under pressure, a dispensing valve, means forming a conduit for delivering water and gas from said sources to said valve, said conduit means having an inlet connected with said liquid source and an inlet connected with said gas source, means responsive to opening of said dispenser valve to provide a gas pressure at said conduit liquid inlet less than the pressure of said liquid source, and means to provide an increase in gas pressure at said conduit higher than said liquid source pressure in response to closing of said dispenser valve.

2. A liquid and gas mixing and dispensing system as defined in claim 1 in which the liquid is water.

3. A liquid and gas mixing and dispensing system as defined in claim 1 in which the gas is $CO_2$.

4. A liquid and gas mixing and dispensing system as defined in claim 1 in which the liquid is water and the gas is CO2.

5. A liquid and gas mixing carbonating and dispensing system as defined in claim 1 further characterized by means to maintain the pressure of gas at said gas source appreciably higher than the pressure at said liquid source, and pressure reducing means in said conduit means between said inlets for reducing the pressure of gas flowing into said conduit means below the pressure of said liquid source.

6. A liquid and gas mixing and dispensing system as defined in claim 5 further characterized by said pressure reducing means comprising a restricted orifice in said conduit means between said inlet connected with said gas source and said liquid source.

7. A liquid and gas mixing and dispensing system as defined in claim 6 further characterized by a check valve between said liquid source and said conduit inlet connected with said liquid source.

8. A liquid and gas mixing and dispensing system as defined in claim 6 further characterized by a check valve between said source of gas and said conduit inlet connected with said source of gas.

9. A liquid and gas mixing and dispensing system as defined in claim 1 further characterized by means in said conduit means downstream from said inlets for agitating fluid passing to said dispensing valve.

10. A liquid and gas mixing and dispensing system as defined in claim 9 further characterized by said means for agitating fluid comprising tubular wall sections having perforations through said wall sections, and means to direct the flow of fluid in alternate directions through the perforations in alternate wall sections.

11. A liquid and gas mixing and dispensing system as defined in claim 10 in which certain of said tubular segments comprise cylindrical screen material.

12. A liquid and gas mixing and dispensing system as defined in claim 10 further characterized by one of said tubular wall sections being conical.

13. A liquid and gas mixing and dispensing system as defined in claim 12 further characterized by said conical section being the first of said wall sections downstream of said inlets.

14. Apparatus as defined in claim 9 further characterized by said means in said conduit comprising a series of tubular segments extending along the inside said conduit and having a multiplicity of openings through the side walls thereof and arranged with said walls spaced from the inner walls of said conduit, and means forming baffles to direct fluid flowing through said conduit inwardly and then outwardly through the wall openings in alternate sections of said tubular segments at least one of said sections being conical.

15. A liquid and gas mixing and dispensing system as defined in claim 9 further characterized by said means for agitating fluid comprising a conical member arranged axially in said conduit and comprising a wall having a plurality of apertures through which said fluid passes.

* * * * *